United States Patent
Kobayashi et al.

(10) Patent No.: US 9,944,250 B2
(45) Date of Patent: Apr. 17, 2018

(54) GAS GENERATOR

(71) Applicant: DAICEL CORPORATION, Osaka-shi, Osaka (JP)

(72) Inventors: Tomoharu Kobayashi, Tatsuno (JP); Masayuki Yamazaki, Tatsuno (JP); Kenji Fukumoto, Tatsuno (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 15/126,660

(22) PCT Filed: Apr. 6, 2015

(86) PCT No.: PCT/JP2015/060694
§ 371 (c)(1),
(2) Date: Sep. 16, 2016

(87) PCT Pub. No.: WO2015/163123
PCT Pub. Date: Oct. 29, 2015

(65) Prior Publication Data
US 2017/0080894 A1 Mar. 23, 2017

(30) Foreign Application Priority Data
Apr. 23, 2014 (JP) ................................. 2014-089026

(51) Int. Cl.
*B60R 21/274* (2011.01)
*B60R 21/272* (2006.01)
(Continued)

(52) U.S. Cl.
CPC .......... *B60R 21/274* (2013.01); *B60R 21/264* (2013.01); *B60R 21/272* (2013.01); *B60R 2021/26029* (2013.01)

(58) Field of Classification Search
CPC ............................ B60R 21/274; B60R 21/272
(Continued)

(56) References Cited

U.S. PATENT DOCUMENTS 6,289,820 B1 * 9/2001 Anacker ............... B60R 21/272
102/530
7,328,914 B2 * 2/2008 Katsuda ................ B60R 21/261
280/736
(Continued)

FOREIGN PATENT DOCUMENTS

DE         199 54 738 A1      5/2001
DE    10 2006 060 689 A1      6/2008
(Continued)

*Primary Examiner* — Faye M Fleming
(74) *Attorney, Agent, or Firm* — Birch, Stewart, Kolasch & Birch, LLP

(57) ABSTRACT

The present invention provides a gas generator including an ignition device chamber provided with the ignition device, a gas inflow chamber provided with a gas discharge port, and a pressurized gas chamber being arranged in order from the first end; a closing member including a fixing portion and a rupturable plate fixed to the fixing portion and closing between the pressurized gas chamber and the gas inflow chamber; and a breaking device for the rupturable plate being arranged between the ignition device chamber and the gas inflow chamber, the breaking device including a base portion, which has an outer circumferential surface abutted against an inner circumferential wall surface of the cylindrical housing, and a rod extending from the base portion to the rupturable plate, the fixing portion of the closing member including an annular plate surface portion, extending radially inward from the inner circumferential wall surface of the cylindrical housing, and a cylindrical wall portion extending from an inner circumference of the annular plate surface portion towards the gas inflow chamber, the rupturable plate of the closing member being fixed by welding to the annular plate surface portion of the fixing portion from the pressurized gas chamber, the breaking device being disposed such that a tip end of the rod is enclosed by the (Continued)

cylindrical wall portion of the fixing portion of the closing member.

6 Claims, 5 Drawing Sheets

(51) Int. Cl.
 *B60R 21/264* (2006.01)
 *B60R 21/26* (2011.01)
(58) Field of Classification Search
 USPC .......................................................... 280/737
 See application file for complete search history.

(56) References Cited

U.S. PATENT DOCUMENTS

| | | | |
|---|---|---|---|
| 8,870,222 B2* | 10/2014 | Kobayashi | B60R 21/274 |
| | | | 280/736 |
| 2004/0084884 A1 | 5/2004 | Yamazaki et al. | |
| 2005/0218636 A1* | 10/2005 | Falkowski | B60R 21/26 |
| | | | 280/737 |
| 2017/0015273 A1* | 1/2017 | Kobayashi | B60R 21/268 |
| 2017/0043743 A1* | 2/2017 | Kobayashi | B60R 21/274 |

FOREIGN PATENT DOCUMENTS

| | | |
|---|---|---|
| DE | 10 2012 214 747 A1 | 2/2014 |
| JP | 2001-506562 A | 5/2001 |
| JP | 2003-237527 A | 8/2003 |

* cited by examiner

[Fig. 1]
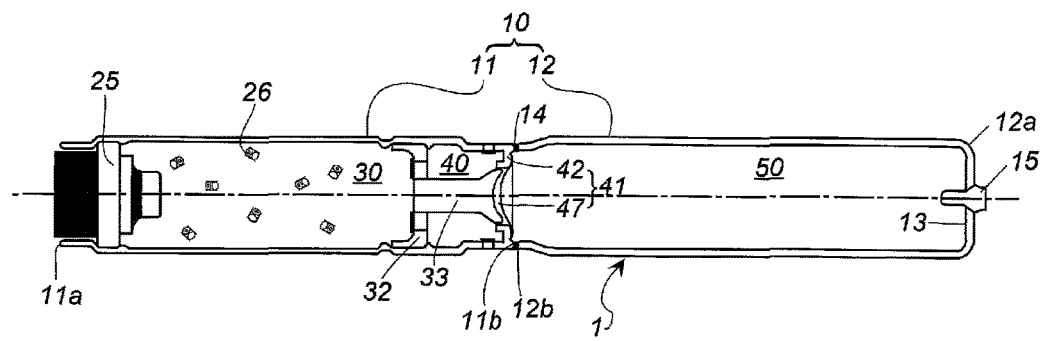
[Fig. 2]
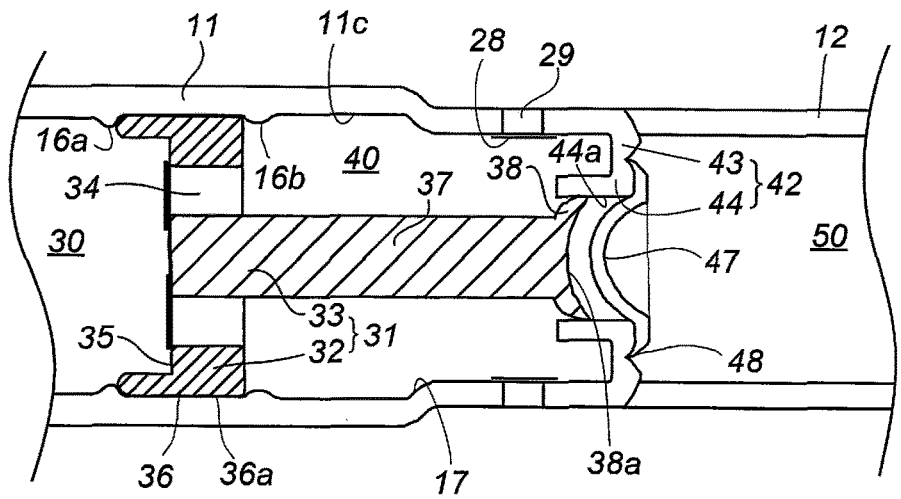

[Fig. 3]
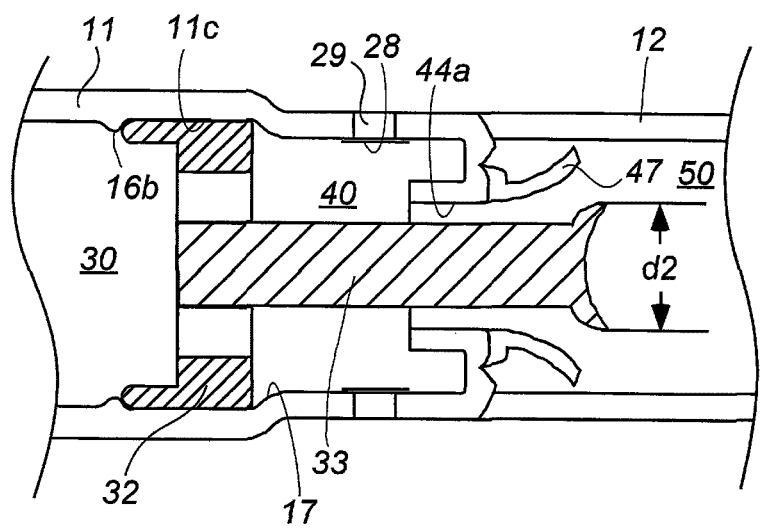
[Fig. 4]
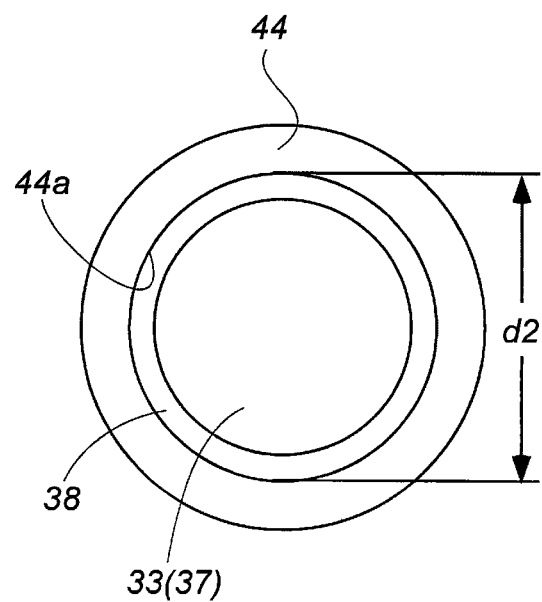

[Fig. 5]
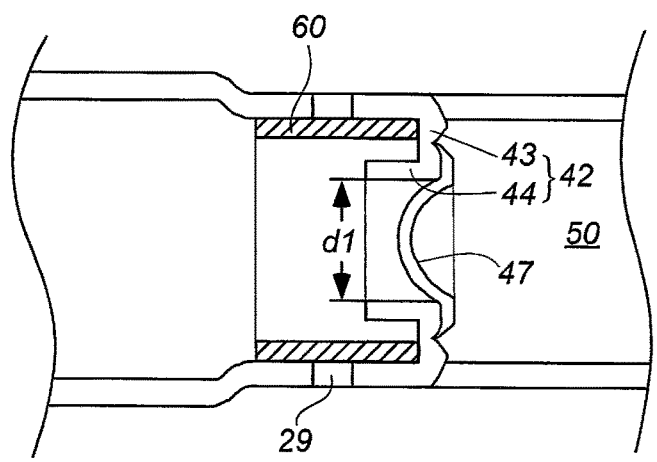
[Fig. 6]
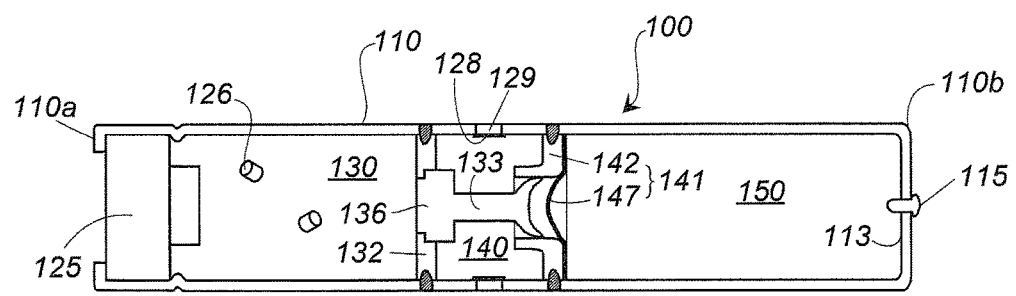

[Fig. 7]
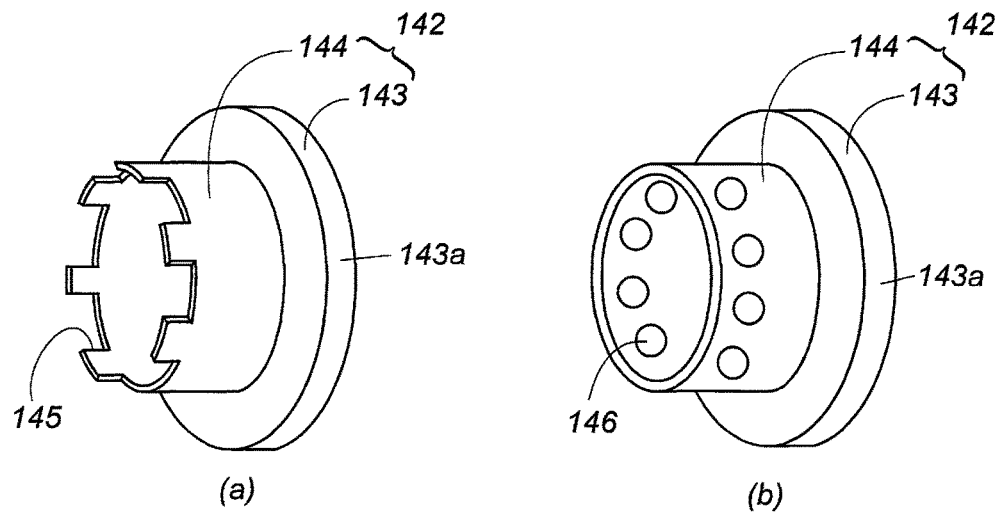
[Fig. 8]
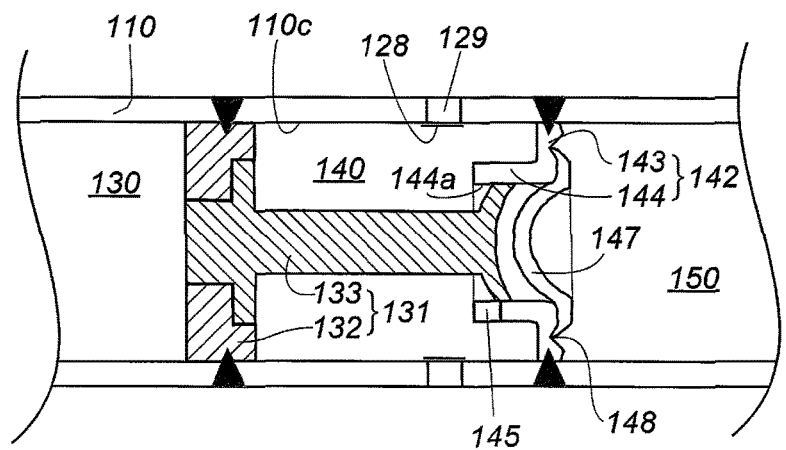

[Fig. 9]
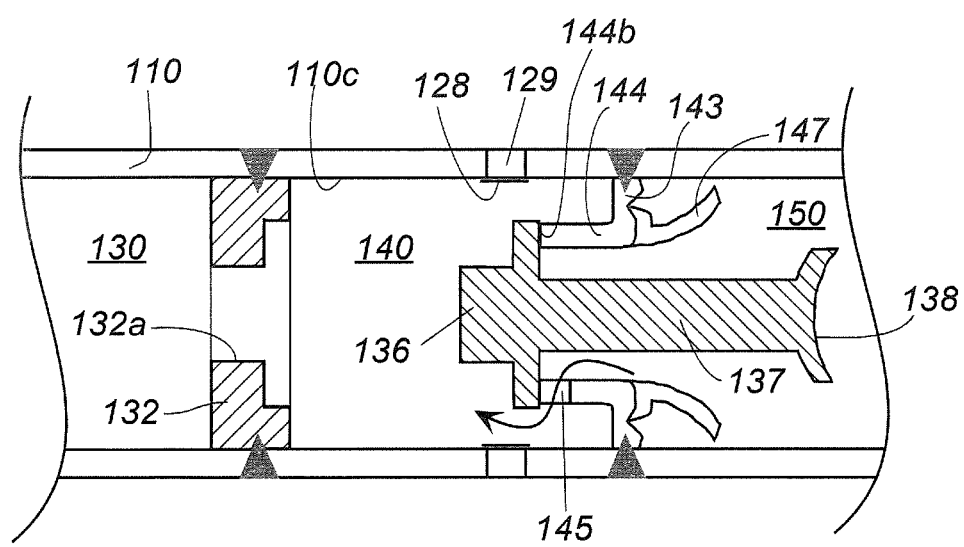

GAS GENERATOR

FIELD OF INVENTION

The present invention relates to a gas generator for use in an airbag apparatus to be installed in a vehicle, the gas generator using a pressurized gas.

DESCRIPTION OF RELATED ART

JP-A No. 2001-506562 discloses an invention relating to a hybrid gas generator.

In the hybrid gas generator depicted in FIG. 3, the interior of a casing 10 serves as a storage chamber 11 which is filled with a gas in a pressurized state. An impact element 25 is also disposed therein.

A diffuser chamber 30 is disposed axially adjacent to the storage chamber 11, and the storage chamber 11 and the diffuser chamber 30 are separated by a partition wall having a communication hole.

The communication hole in the partition wall is closed with a closure element 29, and a plunger 27 formed at the tip end of the impact element 25 is enclosed in a tube guide 28 formed at the communication hole of the partition wall.

In the gas generator depicted in FIG. 3, the tube guide 28 formed at the inner circumferential edge of the communication hole in the partition wall is formed such as to extend towards the storage chamber filled with the pressurized gas.

SUMMARY OF INVENTION

The present invention provides a gas generator including
a cylindrical housing having an ignition device fixed at an opening of a first end thereof and an axially opposite second end thereof being closed, the cylindrical housing including therein, from the first end thereof, an ignition device chamber provided with the ignition device, a gas inflow chamber provided with a gas discharge port, and a pressurized gas chamber;

a closing member including a fixing portion and a rupturable plate fixed to the fixing portion and closing between the pressurized gas chamber and the gas inflow chamber; and a breaking device for the rupturable plate being arranged between the ignition device chamber and the gas inflow chamber, the breaking device including, a base portion, which has an outer circumferential surface abutted against an inner circumferential wall surface of the cylindrical housing, and a rod extending from the base portion to the rupturable plate, the fixing portion of the closing member including an annular plate surface portion, extending radially inward from the inner circumferential wall surface of the cylindrical housing, and a cylindrical wall portion extending from an inner circumference of the annular plate surface portion towards the gas inflow chamber, the rupturable plate of the closing member being fixed by welding to the annular plate surface portion of the fixing portion from the pressurized gas chamber, the breaking device being disposed such that a tip end of the rod is enclosed by the cylindrical wall portion of the fixing portion of the closing member.

BRIEF DESCRIPTION OF THE DRAWINGS

The present invention will become more fully understood from the detailed description given hereinbelow and the accompanying drawings which are given by way of illustration only, and thus are no limitative of the present invention and wherein:

FIG. 1 shows a sectional view, in the X-axis direction, of a gas generator in accordance with the present invention;

FIG. 2 shows a partial enlarged view (before actuation) of FIG. 1;

FIG. 3 shows a partial enlarged view of FIG. 1 illustrating a state after actuation;

FIG. 4 shows a partial sectional view in the radial direction of FIG. 1, illustrating a positional arrangement of the cylindrical wall portion of the closing member and the rod of the breaking device;

FIG. 5 shows a partial enlarged view of FIG. 1 illustrating another embodiment;

FIG. 6 shows an axial sectional view illustrating another embodiment of a gas generator in accordance with the present invention;

FIG. 7 shows, in (a), a perspective view of the fixing portion depicted in FIG. 6 and, in (b), a perspective view of the fixing portion of another embodiment;

FIG. 8 shows a partial enlarged view (before actuation) of FIG. 6; and

FIG. 9 shows a partial enlarged view of FIG. 6 illustrating a state after actuation.

DETAILED DESCRIPTION OF THE INVENTION

In the gas generator depicted in FIG. 3 of JP-A No. 2001-506562, since the interior of the diffuser chamber 30 is under an atmospheric pressure, a large load is applied to the partition wall and the tube guide 28 toward the diffuser chamber 30.

Therefore, the distortion (deformation) of the partition wall more increases toward the center. As a result, the distal end opening of the tube guide 28 on the storage chamber 11 side is also easily deformed to be reduced in diameter.

When the opening of the tube guide 28 is thus reduced in size by deformation, a plunger 27 is pressed from the outside by the deformed tube guide 28 and is unlikely to move in the axial direction. As a result, the gas generator cannot operate normally.

The present invention provides a gas generator for use in an airbag apparatus to be installed in a vehicle, the gas generator using a pressurized gas and being capable of maintaining reliable operation over the service life of the vehicle.

The ignition device chamber includes a known electric igniter which is used in gas generators for airbag apparatuses. If necessary, a transfer charge or a gas generating agent can be used in combination with the igniter.

The gas generated from the gas generating agent is used to inflate the airbag.

The pressurized gas chamber is filled with a gas such as argon, helium, or nitrogen under a prescribed pressure.

A gas discharge port is formed in the cylindrical housing where the gas inflow chamber is formed. A cylindrical filter can be disposed at a position such as to cover the gas discharge port from the inner side.

The closing member closes between the pressurized gas chamber and the gas inflow chamber and includes the fixing portion and the rupturable plate fixed to the fixing portion.

The fixing portion has the annular plate surface portion extending radially inward from the inner circumferential wall surface of the cylindrical housing, and a cylindrical wall portion extending from the inner circumference of the annular plate surface portion towards the gas inflow chamber.

The annular plate surface portion may be a separate member fixed by welding to the inner circumferential wall surface of the cylindrical housing, or may be formed in advance integrally with the inner circumferential wall surface of the cylindrical housing.

A fixing portion can be used in which a boundary portion of the annular plate surface portion and the cylindrical wall portion is a curved surface.

The rupturable plate, which is welded and fixed to the annular plate surface portion, receives a pressure from the pressurized gas chamber and curves hemispherically toward the gas inflow chamber. Therefore, where a corner is present in the boundary portion of the annular plate surface portion and the cylindrical wall portion, this corner can create the concentration of stresses on the hemispherically curved rupturable plate, but this problem is not encountered when the boundary portion is a curved surface.

In the gas generator in accordance with the present invention, it is possible that the breaking device includes the base portion and the rod extending from the base portion towards the rupturable plate, the rod has a rod main body portion extending from the base portion and an enlarged diameter portion where a tip end of the rod main body portion is enlarged in the radial direction, and the enlarged diameter portion is disposed to be enclosed by the cylindrical wall portion of the fixing portion of the closing member.

The breaking device for the rupturable plate is disposed between the ignition device chamber and the gas inflow chamber.

The breaking device includes the base portion and the rod extending from the base portion toward the rupturable plate.

In the base portion, the outer circumferential surface abuts against the inner circumferential wall surface of the cylindrical housing.

At the time of actuation, the breaking device may slide axially in such a state that the base portion abuts against the inner circumferential wall surface of the cylindrical housing, whereby the base portion and the rod move as an unit in the axial direction (toward the rupturable plate) to break the rupturable plate. Alternatively, the base portion may not move, and only the rod detached from the base portion may move in the axial direction (toward the rupturable plate) to break the rupturable plate.

The breaking device is disposed such that the tip end of the rod is enclosed in the cylindrical wall portion of the fixing portion of the closing member.

The rod has the rod main body portion and the enlarged diameter portion which is radially enlarged in diameter from the rod main body portion, the enlarged diameter portion being positioned at the tip end of the rod.

A plurality of protrusions protruding radially outward from the tip end of the rod may be formed in the enlarged diameter portion at the tip end of the rod, and it is preferred that 3 to 6 protrusions are formed equidistantly in the circumferential direction.

No protrusion may be formed in the enlarged diameter portion at the tip end of the rod.

The end surface of the tip end of the rod including the enlarged diameter portion can be receded as a whole from the outer circumference to the central portion (for example, in a curved shape). With such a shape, the punched rupturable plate is easily received by the recess.

It is preferred that a slight gap is present between the tip end (or the enlarged diameter portion) of the rod and the cylindrical wall portion.

As mentioned hereinabove, the annular plate surface portion serving as the fixing portion extends radially inward from the inner circumferential wall surface of the cylindrical housing, and the cylindrical wall portion further extends from the inner circumference of the annular plate surface portion toward the gas inflow chamber.

The rupturable plate is fixed by welding to the annular plate surface portion.

The inner diameter ($d_1$) of the opening of the cylindrical wall portion on the side of the gas inflow chamber and the outer diameter ($d_2$) of the tip end (or the enlarged diameter portion) of the rod are preferably such that a slight gap is formed between the opening and the tip end (that is, $d_1 > d_2$ and $d_1/d_2$ has a numerical value close to 1).

The gas inflow chamber is under the atmospheric pressure, and the pressurized gas chamber is maintained under a high pressure. Therefore, a pressure from the pressurized gas chamber is continuously applied to the fixing portion over a long period of time after assembly of the gas generator.

When a pressure is thus continuously applied, the annular plate surface portion is pushed toward the gas inflow chamber. As a result, the cylindrical wall portion is deformed such as to expand radially outward. Therefore, the inner diameter ($d_1$) of the opening of the cylindrical wall portion on the side of the gas inflow chamber is further increased.

As described hereinabove, where the relationship between $d_1$ and $d_2$ is considered in JP-A No. 2001-506562, the deformation results in a reversed relationship of $d_1 < d_2$.

Thus, in the gas generator in accordance with the present invention, the deformation proceeds such that a gap appears between the opening ($d_1$) of the cylindrical wall portion and the tip end ($d_2$) of the rod. Therefore, the problem of abnormal operation in JP-A No. 2001-506562 does not occur.

Even when the tip end (the enlarged diameter portion) of the rod is not in contact with the cylindrical wall portion, the rod moves inside the cylindrical wall portion at the time of actuation and, therefore, reliably collides with the rupturable plate.

Further, even if the center axis of the rod is displaced at the time of actuation, since the cylindrical wall portion exerts a guiding function, the rod reliably collides with the rupturable plate.

In the gas generator in accordance with the present invention, it is possible that the base portion and the rod in the breaking device are integrated with each other, and the base portion has a disk portion having a through hole in the thickness direction, and an outer circumferential surface of the disk abuts against the inner circumferential wall surface of the cylindrical housing so as to enable sliding in an axial direction.

Since the base portion and the rod in the breaking device are integrated with each other, at the time of actuation, the base portion moves while sliding over the inner circumferential wall surface of the cylindrical housing in the direction of the rupturable plate, and the rod collides with, breaks, and opens the rupturable plate.

When the ignition device chamber is filled with a gas generating agent, the through hole of the base portion serves as a passage hole for the combustion gas.

The through hole of the base portion may be closed with a sealing tape formed of aluminum or the like.

A movement stopping member can be formed to prevent the base portion from moving in the axial direction before the actuation.

The movement stopping member may be protrusions which protrude from the inner circumferential wall surface of the cylindrical housing to hold the base portion from both sides in the thickness direction.

In the gas generator in accordance with the present invention, it is possible that the base portion and the rod in the breaking device are integrated with each other, the base portion has a disk portion having a through hole in the thickness direction, and a cylindrical wall surface portion extending from an outer circumference of the disk portion towards the ignition device, and an outer circumferential surface of the cylindrical wall surface portion abuts against the inner circumferential wall surface of the cylindrical housing so as to enable sliding in the axial direction.

Since the base portion and the rod in the breaking device are integrated with each other, at the time of actuation, the base portion moves while sliding over the inner circumferential wall surface of the cylindrical housing in the direction of the rupturable plate, and the rod collides with, breaks, and opens the rupturable plate.

The base portion includes the disk portion and the cylindrical wall surface portion, and the contact surface area of the base portion with the inner circumferential wall surface of the cylindrical housing is larger than that of a base portion including only the disk portion. As a result, the base portion slides less easily, but favorably, the center axis of the rod is unlikely to deviate during sliding.

However, the contact surface area with the inner circumferential wall surface of the housing may be reduced by receding part of the cylindrical wall surface portion.

When the ignition device chamber is filled with a gas generating agent, the through hole in the base portion serves as a passage hole for the combustion gas.

The through hole of the base portion may be closed with a sealing tape made of aluminum or the like.

A movement stopping member can be formed to prevent the base portion from moving in the axial direction before the actuation.

The movement stopping member may be protrusions which protrude from the inner circumferential wall surface of the cylindrical housing to hold the base portion from both sides in the thickness direction.

In the gas generator in accordance with the present invention, it is possible that the breaking device includes the base portion having a through hole in the thickness direction and the rod which is detachably press-fitted into a through hole in the base portion, and the base portion is a disk, and an outer circumferential surface of the disk portion is fixed to the inner circumferential wall surface of the cylindrical housing.

In the gas generator in accordance with the present invention, it is possible that the cylindrical wall portion of the fixing portion of the closing member has a notch or a through hole in the thickness direction, the breaking device includes the base portion having a through hole in the thickness direction and the rod which is detachably press-fitted into the through hole in the base portion, and the base portion is a disk, and an outer circumferential surface of the disk is fixed to the inner circumferential wall surface of the cylindrical housing.

In the breaking device, the rod is detachable from the base portion, and the base portion is fixed to the inner circumferential wall surface of the cylindrical housing.

At the time of actuation, the rod is detached from the base portion and then flies out axially, collides with, breaks, and opens the rupturable plate.

Since the tip end of the rod is enclosed by the cylindrical wall portion of the fixing portion, even when the rod is detached from the base portion and flies out, the cylindrical wall portion functions as a guide portion, and thereby the rod reliably collides with the rupturable plate.

After the rod is detached, the through hole of the base portion becomes a passage hole for the combustion gas when the ignition device chamber is filled with a gas generating agent.

The cylindrical wall portion of the fixing portion may have a notch or a through hole in the thickness direction which serves as a gas passage hole.

When used in an airbag apparatus of a vehicle, the gas generator in accordance with the present invention maintains operation reliability over the service life of the vehicle.

DESCRIPTION OF EMBODIMENTS (1) Gas Generator Depicted in FIG. 1 to FIG. 5

In a gas generator 1 depicted in FIG. 1, an ignition device chamber 30, a gas inflow chamber 40, and a pressurized gas chamber 50 are arranged inside a cylindrical housing 10.

The cylindrical housing 10 formed by an ignition device chamber housing 11 and a pressurized gas chamber housing 12, but may be formed by a single housing as a whole.

An electric igniter 25 is fixed in an opening of the ignition device chamber housing 11 at a first end 11a.

The pressurized gas chamber housing 12 is closed (a closing surface 13) at a second end 12a.

An opening at a second end 11b of the ignition device chamber housing 11 and an opening at a first end 12b of the pressurized gas chamber housing 12 are integrated by welding in a joint portion 14.

The cylindrical housing 10 (the ignition device chamber housing 11 and the pressurized gas chamber housing 12) are made of iron, stainless steel, or the like.

The interior of the pressurized gas chamber 50 is filled under a high pressure with a gas such as argon or helium.

The gas is filled from a gas filling hole in the closing surface 13 of the pressurized gas chamber housing 12.

After filling with the gas, a pin 15 is inserted in the gas filling hole, and the pin 15 and the closing surface 13 are welded together to close the gas filling hole.

A closing member 41 closes between the pressurized gas chamber 50 and the gas inflow chamber 40.

The closing member 41 includes a fixing portion 42 and a rupturable plate 47 that is fixed by welding to the fixing portion 42.

The fixing portion 42 has an annular plate surface portion 43 extending radially inward from the second end 11b of the ignition device chamber housing 11, and a cylindrical wall portion 44 extending from the inner circumference of the annular plate surface portion 43 toward the gas inflow chamber 40 (see FIG. 2).

A boundary portion of the annular plate surface portion 43 and the cylindrical wall portion 44 of the fixing portion 42 is a curved surface.

The annular plate surface portion 43 of the fixing portion 42 has an annular groove 48 on a surface on the side of the pressurized gas chamber 50 (see FIG. 2).

The rupturable plate 47 is made of iron, stainless steel, and the like. The peripheral portion of the rupturable plate abuts against the annular groove 48 formed in the annular plate surface portion 43 of the fixing portion 42, and, in this state, the rupturable plate is fixed and welded at the abutting portion. In this case, the rupturable plate 47 is deformed toward the gas inflow chamber 40 along the curved surface of the boundary portion between the annular plate surface portion 43 and the cylindrical wall portion 44 by the pressure of the pressurized gas filled in the pressurized gas chamber 50. Therefore, the concentration of stresses on the rupturable plate in the boundary portion is avoided due to the curved surface. The pressure resistance of the rupturable plate is thus increased.

The gas inflow chamber 40 is a space into which a gas flows from the pressurized gas chamber 50 and a combustion gas flows from the ignition device chamber 30 at the time of actuation.

In FIG. 2, a plurality of gas discharge ports 29 are formed in the ignition device chamber housing 11 in the portion facing the gas inflow chamber 40.

The plurality of the gas discharge ports 29 are formed equidistantly in the circumferential direction of the ignition device chamber housing 11.

In the gas inflow chamber 40, a step portion 17 is formed between the ignition device chamber 30 and the rupturable plate 47.

The step portion 17 is formed by reducing the inner diameter of the ignition device chamber housing 11 between the ignition device chamber 30 and the rupturable plate 47. A plurality of protrusions protruding inward from an inner circumferential wall surface 11c of the ignition device chamber housing 11 may be arranged instead of the step portion 17.

A breaking device 31, which includes a base portion 32 and a rod 33 extending from the base portion 32 toward the rupturable plate 47, is disposed between the gas inflow chamber 40 and the ignition device chamber 30.

In the breaking device 31 depicted in FIG. 1 to FIG. 3, the base portion 32 and the rod 33 are integrated.

The base portion 32 includes a disk portion 35 having a plurality of through holes 34 in the thickness direction, and a cylindrical wall surface portion 36 extending from the outer periphery of the disk portion 35 toward the igniter 25.

The through holes 34 are closed by an aluminum sealing tape from the ignition device chamber 30.

In the base portion 32, an outer circumferential surface 36a of the cylindrical wall surface portion 36 abuts against the inner circumferential wall surface 11c of the ignition device chamber housing 11, so that the base portion slides in the axis X direction. Since the length of the cylindrical wall surface portion 36 in the axis X direction is larger than the thickness of the disk portion 35, the base portion 32 slides parallel to the axis X, so that the rod 33 does not tilt with respect to the axis X.

The cylindrical wall surface portion 36 is held at both sides in the thickness direction by two protrusions 16a, 16b projecting inward at a distance from each other from the inner circumferential wall surface 11c of the ignition device chamber housing 11.

A sealing agent for maintaining the air tightness is coated between the outer circumferential surface 36a of the cylindrical wall surface portion 36 and the inner circumferential wall surface 11c of the ignition device chamber housing 11.

The rod 33 has a rod main body portion 37 extending from the base portion 32 and an enlarged diameter portion 38 which is enlarged in diameter radially outward from the rod main body portion 37.

The enlarged diameter portion 38 can be formed as a continuous annular portion such as depicted in FIG. 4, but also may be a combination of a plurality of protrusions formed in the circumferential direction.

In FIG. 4, the rod 33 and the fixing portion 42 are viewed from the pressurized gas chamber housing 50, and the rupturable plate 47 is omitted.

In the enlarged diameter portion 38 depicted in FIG. 4, a slight gap is formed between the outer circumference of the enlarged diameter portion 38 and the cylindrical wall portion 44.

The diameter (d2) of the enlarged diameter portion 38 is less than the inner diameter (d1) of the cylindrical wall portion 44.

A surface 38a (see FIG. 2) of the enlarged diameter portion 38 of the rod 33 is shaped to be curved toward the center thereof, as depicted in FIG. 1 to FIG. 3, but it may be, for example, in the form of a rectangular recess.

The breaking device 31 and the closing member 41 are disposed such that the enlarged diameter portion 38, which is the tip end of the rod 33, is enclosed by the cylindrical wall portion 44 of the fixing portion 42 before the actuation. In this state, a slight gap is formed between the outer circumference of the enlarged diameter portion 38 and the inner circumferential surface 44a of the cylindrical wall portion 44 (that is, d1>d2, and d1/d2 has a numerical value close to 1).

In the ignition device chamber 30, the igniter 25 is fixed at the first end 11a, and the opposite side in the axis X direction is partitioned by the base portion 32.

The interior of the ignition device chamber 30 is filled with a predetermined amount of a molded article of a gas generating agent 26.

In the gas generator 1 depicted in FIG. 1, a cylindrical filter 60 can be disposed inside the gas inflow chamber 40, as depicted in FIG. 5.

The cylindrical filter 60 is disposed in a position to abut against three locations, that is, the annular plate surface portion 43, the inner circumferential surface 11c of the ignition device chamber housing 11 and the gas discharge ports 29, the cylindrical filter 60 covering the gas discharge ports 29 from the inner side.

The operation of the gas generator 1 depicted in FIG. 1 will be explained hereinbelow with reference to FIG. 1 to FIG. 5.

When the gas generator 1 is used as a gas generator for an airbag system of a vehicle, the gas generator is to be used continuously for ten or more years which is the service life of the vehicle.

Therefore, a high pressure is continuously applied from the pressurized gas chamber 50 to the closing member 41.

When the pressure is thus continuously applied, the annular plate surface portion 43 of the fixing portion 42 can be deformed from the periphery of the boundary between the annular plate surface portion 43 and the ignition device chamber housing 11 towards the gas inflow chamber 40. As a result, the end portion of the cylindrical wall portion 44 on the side of the gas inflow chamber 40 is deformed radially outward and the diameter d1 (in FIG. 5) of the cylindrical wall portion 44 increases.

Immediately after the gas generator 1 is assembled, the enlarged diameter portion 38 (the outer diameter d2; see FIG. 3 and FIG. 4) of the rod 33 forms a slight gap with the inner wall surface 44a of the cylindrical wall portion 44 (that is, d1>d2), and if ever the deformation proceeds such that d1 increases, as mentioned hereinabove, d1 becomes even larger than d2 (the difference d1−d2 increases).

Therefore, even when the deformation of the fixing portion 42 occurs after ten or more years since the gas generator 1 was assembled, the relationship d1>d2 is maintained and no adverse effect is produced on the sliding of the breaking device 31 in the axis X direction.

The molded article of a gas generating agent 26 is ignited and burnt by the combustion products generated by the actuation of the igniter 25, and a high-temperature combustion gas is generated.

Where the pressure inside the ignition device chamber 30 is raised by the combustion gas, the base portion 32 of the breaking device 31 passes over the protrusion 16b and moves in the axis X direction while sliding over the inner circumferential wall surface 11c of the ignition device chamber housing.

The base portion 32 then collides with the step portion 17 having a reduced inner diameter and stops, but since the enlarged diameter portion 38 of the rod 33 collides with and breaks the rupturable plate 47, the gas inside the pressurized gas chamber 50 flows into the gas inflow chamber 40 from the gap between the opened rupturable plate 47 and the rod 33 (in FIG. 3).

In parallel with this process, the sealing tape closing the through holes 34 of the base portion 32 is ruptured and the combustion gas flows from the through holes 34 into the gas inflow chamber 40.

Even if the center axis of the rod 33 is displaced when the breaking device 31 (the base portion 32) slides at the time of actuation, since the cylindrical wall portion 44 exerts a guiding function, the breaking device reliably collides with the rupturable plate 47.

The combustion gas and the pressurized gas flowing into the gas inflow chamber 40 rupture the sealing tape 28 closing the gas discharge ports 29 and are discharged from the gas discharge ports 29.

It can be considered that the combustion gas and the pressurized gas are discharged such that part of either one of the gases is initially discharged from the gas discharge ports 29 and then the remaining gases are discharged as a gas mixture. However, the gas discharge state or timing is not limited.

(2) Gas Generator Depicted in FIG. 6 to FIG. 9

In the gas generator 100 depicted in FIG. 6, an ignition device chamber 130, a gas inflow chamber 140, and a pressurized gas chamber 150 are disposed inside a cylindrical housing 110. The ignition device chamber 130, the gas inflow chamber 140, and the pressurized gas chamber 150 are formed in a single cylindrical housing 110.

An electric igniter 125 is fixed in an opening at a first end 110a of the cylindrical housing 110, and a second end 110b is closed (a closing surface 113).

The cylindrical housing 110 is made of iron, stainless steel, or the like.

The interior of the pressurized gas chamber 150 is filled under a high pressure with a gas such as argon or helium.

The gas is filled from a gas filling hole in the closing surface 113.

After filling with the gas, a pin 115 is inserted in the gas filling hole, and the pin 115 and the closing surface 113 are welded together to close the gas filling hole.

A closing member 141, formed separately from the cylindrical housing, closes between the pressurized gas chamber 150 and the gas inflow chamber 140.

The closing member 141 includes a fixing portion 142 and a rupturable plate 147 that is fixed to the fixing portion 142.

The fixing portion 142 has an annular plate surface portion 143 that is fixed by welding to an inner circumferential wall surface 110c of the cylindrical housing 110 and extends radially inward, and a cylindrical wall portion 144 extending from the inner circumference of the annular plate surface portion 143 toward the gas inflow chamber 140.

The fixing portion 142 is depicted in (a) and (b) in FIG. 7.

The fixing portion 142 depicted in (a) in FIG. 7 has the annular plate surface portion 143 and the cylindrical wall portion 144, and a plurality of notches 145 are formed in the circumferential direction in an opening of the cylindrical wall portion 144 on the gas inflow chamber 140 side.

The fixing portion 142 depicted in (b) in FIG. 7 has the annular plate surface portion 143 and the cylindrical wall portion 144, and a plurality of through holes 146 are formed in the circumferential direction in the cylindrical wall portion 144.

Each of the plurality of the notches 145 and the plurality of the through holes 146 serves as a passage hole for the gas flow from the pressurized gas chamber 150 to the gas inflow chamber 140 at the time of actuation.

A boundary portion between the annular plate surface portion 143 and the cylindrical wall portion 144 in the fixing portion 142 has a curved surface.

The annular plate surface portion 143 of the fixing portion 142 has an annular groove 148 on a surface on the side of the pressurized gas chamber 150.

The rupturable plate 147 is made of iron, stainless steel, and the like. The peripheral portion of the rupturable plate abuts against the annular groove 148 formed in the annular plate surface portion 143 of the fixing portion 142, and in this state, the rupturable plate is fixed by welding in the contact portion. In such a case, the rupturable plate 147 is deformed toward the gas inflow chamber 140 along the curved surface of the boundary portion between the annular plate surface portion 143 and the cylindrical wall portion 144 by the pressure of the pressurized gas filled in the pressurized gas chamber 150. Therefore, the concentration on stresses to the rupturable plate in the boundary portion is avoided due to the curved surface. The pressure resistance of the rupturable plate 147 is thus increased.

A breaking device 131 is disposed between the gas inflow chamber 140 and the ignition device chamber 130.

A plurality of gas discharge ports 129 closed from the inner side by an aluminum sealing tape 128 are formed in the cylindrical housing 110 in the portion facing the gas inflow chamber 140.

The breaking device 131 includes a base portion 132 having a through hole 132a in the thickness direction and a rod 133 detachably press-inserted into the through hole 132a of the base portion 132.

The outer circumferential surface of the base portion 132 abuts against the inner circumferential wall surface 110c of the cylindrical housing 110 and is fixed by welding in the contact portion.

The rod 133 has a substantially disk-shaped press-fitting portion 136 which is press-fitted into the base portion 132, a rod main body portion 137 extending from the press-fitting portion 136, and an enlarged diameter portion 138 which is enlarged in diameter radially outward from the rod main body portion 137.

The enlarged diameter portion 138 can be the same as depicted in FIG. 4.

The breaking device 131 and the closing member 141 are disposed such that the enlarged diameter portion 138 which is the tip end of the rod 133 is enclosed by the cylindrical wall portion 144 of the fixing portion 142. In this case, the outer circumferential portion of the enlarged diameter portion 138 and the inner circumferential surface 144a of the cylindrical wall portion 144 do not abut against each other. The inner diameter of the cylindrical wall portion 144 and the outer diameter of the enlarged diameter portion 138 satisfy the relationship same as that illustrated by FIG. 3 to FIG. 5 (that is, d1>d2, and d1/d2 has a numerical value close to 1).

In the ignition device chamber 130, the igniter 125 is fixed at the first end 110a, and the opposite side in the axial direction is partitioned by the base portion 132 and the rod 133.

The interior of the ignition device chamber 130 is filled with a predetermined amount of a molded article of a gas generating agent 126.

In the gas generator 100 depicted in FIG. 6, a cylindrical filter 60 can be disposed inside the gas inflow chamber 140 at a position facing the gas discharge ports 129, as depicted in FIG. 5. In this case, the sealing tape 128 is not used, and a sealing agent is coated on the contact portion of the base portion 132 and the press-fitting portion 136.

The operation of the gas generator 100 depicted in FIG. 6 will be explained hereinbelow with reference to FIG. 6 to FIG. 9.

When the gas generator 100 is used as a gas generator for an airbag system of a vehicle, the gas generator is to be used continuously for ten or more years which is the service life of the vehicle.

Therefore, a high pressure is continuously applied from the pressurized gas chamber 150 to the closing member 141.

When the pressure is thus continuously applied, the annular plate surface portion 143 of the fixing portion 142 is deformed at the welded portion to the cylindrical housing 110 toward the gas inflow chamber 140. As a result, the end portion of the cylindrical wall portion 144 on the side of the gas inflow chamber 140 is deformed radially outward and the inner diameter (the inner diameter corresponding to d1 in FIG. 5) of the cylindrical wall portion 144 increases.

Even if the deformation of the fixing portion 142 occurs after ten or more years after assembly of the gas generator 100, the relationship d1>d2 is maintained and no adverse effect is produced on the sliding of the breaking device 131 in the axis X direction.

The molded article of a gas generating agent 126 is ignited and burnt by the combustion products generated by the actuation of the igniter 125, and a high-temperature combustion gas is generated.

Where the pressure inside the ignition device chamber 130 is raised by the combustion gas, the rod 133 is detached from the base portion 132 of the breaking device 131, the rod main body portion 137 and the enlarged diameter portion 138 enter the cylindrical wall portion 144 and collide with and open the rupturable plate 147, and the substantially disk-shaped press-fitting portion 136 abuts against an opening circumferential edge 144b of the cylindrical wall portion 144.

In this case, since the relationship d1>d2 is maintained, as mentioned hereinabove, the rod 133 is not prevented from flying out.

Further, since the cylindrical wall portion 144 functions as a guide for the enlarged diameter portion 138, even when the center axis of the rod 133 is displaced, the rod reliably collides with the rupturable plate 147.

In parallel with this process, the combustion gas located inside the ignition device chamber 130 flows into the gas inflow chamber 140 from the through holes 132a in the base portion 132 after the rod 133 is detached.

The gas inside the pressurized gas chamber 150 then flows into the gas inflow chamber 140 through the notches 145 of the cylindrical wall portion 144.

The combustion gas and the pressurized gas flowing into the gas inflow chamber 140 rupture the sealing tape 128 and are discharged from the gas discharge ports 129.

It can be considered that the combustion gas and the pressurized gas are discharged such that part of either one of the gases ruptures the sealing tape 128 and is discharged from the gas discharge ports 129 and then the remaining gases are discharged as a gas mixture. However, this discharge state is not limited.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
   a cylindrical housing having an ignition device fixed at an opening of a first end thereof and an axially opposite second end thereof being closed, the cylindrical housing including therein, sequentially from the first end thereof, an ignition device chamber provided with the ignition device, a gas inflow chamber provided with a gas discharge port and a pressurized gas chamber filled with pressurized gas, whereby the gas inflow chamber is located between the ignition device chamber and the pressurized gas chamber;
   a closing member including a fixing portion and a rupturable plate fixed to the fixing portion and closing between the pressurized gas chamber and the gas inflow chamber; and
   a breaking device for the rupturable plate being arranged between the ignition device chamber and the gas inflow chamber, the breaking device including,
      a base portion, which has an outer circumferential surface abutted against an inner circumferential wall surface of the cylindrical housing, and
      a rod extending from the base portion to the rupturable plate,
   the fixing portion of the closing member including an annular plate surface portion, extending radially inward from the inner circumferential wall surface of the cylindrical housing, and a cylindrical wall portion extending from an inner circumference of the annular plate surface portion towards the gas inflow chamber,
   the rupturable plate of the closing member being fixed by welding to the annular plate surface portion of the fixing portion from the pressurized gas chamber,
   the breaking device being disposed such that a tip end of the rod is enclosed by the cylindrical wall portion of the fixing portion of the closing member.

2. The gas generator according to claim 1, wherein
   the breaking device includes the base portion and the rod extending from the base portion towards the rupturable plate,
   the rod has a rod main body portion extending from the base portion and an enlarged diameter portion where a tip end of the rod main body portion is enlarged in the radial direction, and the enlarged diameter portion is disposed to be enclosed by the cylindrical wall portion of the fixing portion of the closing member.

3. The gas generator according to claim 1, wherein
the base portion and the rod in the breaking device are integrated with each other, and
the base portion has a disk portion having a through hole in the thickness direction, and an outer circumferential surface of the disk abuts against the inner circumferential wall surface of the cylindrical housing so as to enable sliding in an axial direction.

4. The gas generator according to claim 1, wherein
the base portion and the rod in the breaking device are integrated with each other,
the base portion has a disk portion having a through hole in the thickness direction, and a cylindrical wall surface portion extending from an outer circumference of the disk portion towards the ignition device, and an outer circumferential surface of the cylindrical wall surface portion abuts against the inner circumferential wall surface of the cylindrical housing so as to enable sliding in the axial direction.

5. The gas generator according to claim 1 wherein
the breaking device includes the base portion having a through hole in the thickness direction and the rod which is detachably press-fitted into a through hole in the base portion, and
the base portion is a disk, and an outer circumferential surface of the disk portion is fixed to the inner circumferential wall surface of the cylindrical housing.

6. The gas generator according to claim 1 wherein
the cylindrical wall portion of the fixing portion of the closing member has a notch or a through hole in the thickness direction,
the breaking device includes the base portion having a through hole in the thickness direction and the rod which is detachably press-fitted into the through hole in the base portion, and
the base portion is a disk, and an outer circumferential surface of the disk is fixed to the inner circumferential wall surface of the cylindrical housing.

* * * * *